May 3, 1932.   F. KRATZ   1,856,342
BRAKE CONTROL DEVICE
Filed Aug. 29, 1929   2 Sheets-Sheet 1

INVENTOR
Franz Kratz,
BY Steward & McKay
ATTORNEYS.

May 3, 1932. F. KRATZ 1,856,342
BRAKE CONTROL DEVICE
Filed Aug. 29, 1929 2 Sheets-Sheet 2

INVENTOR
Franz Kratz,
BY Steward & McKay
ATTORNEYS.

Patented May 3, 1932

1,856,342

UNITED STATES PATENT OFFICE

FRANZ KRATZ, OF STUTTGART, GERMANY, ASSIGNOR TO SERVO-FREIN DEWANDRE, SOCIETE ANONYME, OF LIEGE, BELGIUM

BRAKE CONTROL DEVICE

Application filed August 29, 1929, Serial No. 389,229, and in Germany September 7, 1928.

The present invention relates to an improved control device for vacuum operated or assisted brakes particularly suitable for automobiles and the like, of the type in which an oscillating valve operated from a pedal plate on the pedal lever controls the connection between atmosphere and the brake cylinder or between the vacuum existing in the induction pipe of the engine and the brake cylinder.

The object of the present invention is to control the double disc valve for operating the brake cylinder no longer electrically but mechanically by means of an element resiliently connected with the brake lever on which the muscular energy acts directly whereby the pressure in the brake cylinder is again regulated by oscillation of the valve between its extreme positions in the housing. For this purpose the valve housing is rigidly connected with the brake lever whilst the double disc valve is mechanically controlled by an element articulated to the brake lever which directly takes up the muscular energy of the driver. The parts are so relatively arranged that the valve can maintain the duct to the source of power closed when the element articulated to the brake lever is not loaded.

Several forms of construction of the invention applied to auxiliary braking mechanisms in which the vacuum in the suction pipe of an internal combustion engine is used to apply the brakes are shown in the drawings, in which:—

Figure 1:
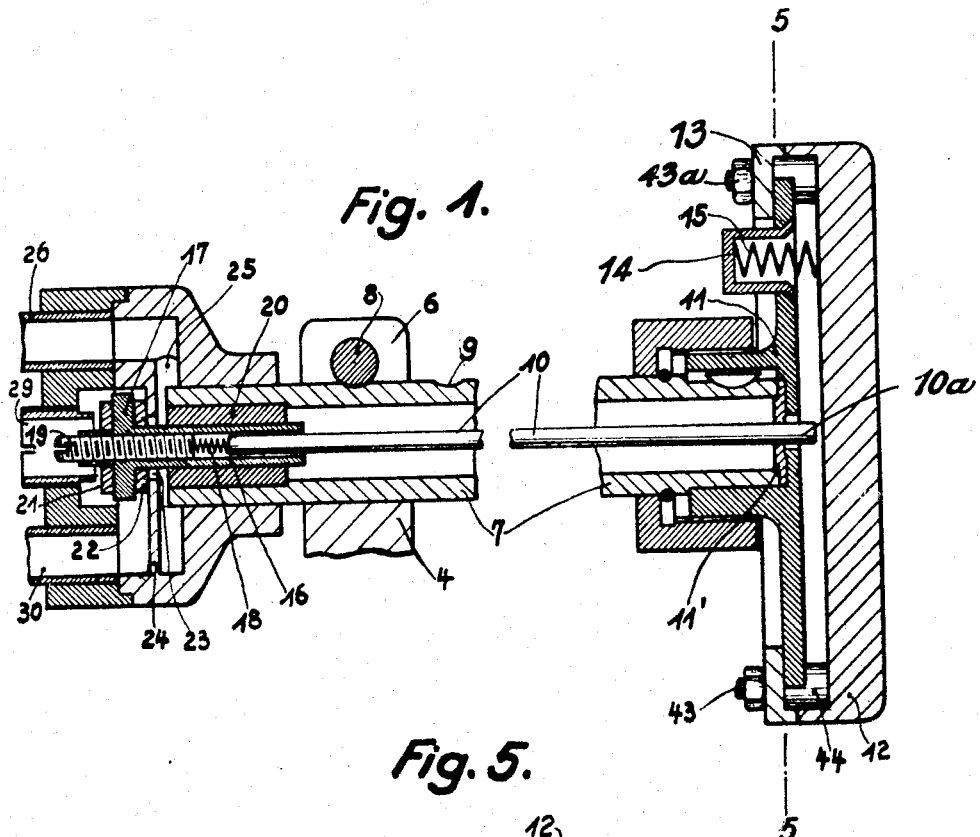
Figure 1 is a longitudinal section through parts of the control mechanism.

A piston 2 connected with the foot brake lever 4 by a cable 3 works in the brake cylinder 1. The brake rod 5 is also connected with the lever 4. The free end of the lever 4 is constructed as a box 6 in which one end of a tube 7 can be clamped in various positions by the bolt 8 engaging in indentations 9. A spindle 10 located axially in the tube 7, the hemispherical end 10a is guided by a closing disc 11' on the tube 7 and by a hole in the plate 11 and bears against the plate 12. The other end of the spindle 10 projects into the hollow shaft 16 of the disc valve 17 and bears by means of a pressure spring 18 against an adjusting screw 19 on the valve spindle 16. This valve spindle 16 is guided in the bush 20 mounted in the pipe 7. The valve face plates 21, 22 are arranged on both sides of the disc valve 17. The plate 22 closes the aperture 23 in the wall 24 of the valve casing when the plate 12 is not loaded. A chamber 25 is formed between the wall 24 and the wall of the valve housing receiving the end of the tube 7 and communicating with the nipple 26 for connection to the suction pipe 27 which in turn is connected to the inlet pipe 28 of an internal combustion engine (not shown). The seating for the plate 21 is formed by the end of the hollow sleeve 29 which forms the inlet for the atmospheric air to the brake cylinder. A nipple 30 is connected to the chamber formed by the wall 24 and the sleeve 29 and from this nipple a flexible pipe 31 is led along the cable 3 to a nipple 32 on the head of the piston 2.

Figure 5:
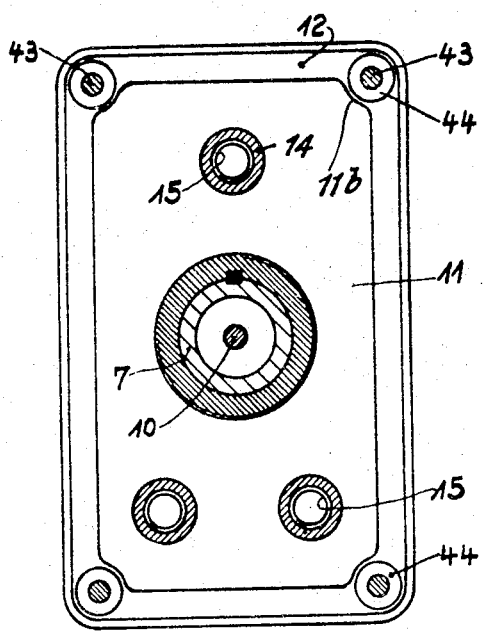
Figure 5 is a sectional detail plan view of the pedal construction on the line 5—5 of Figure 1.

The details of the construction of the brake pedal are illustrated in Figures 1 and 5. The rectangular plate 12 of the pedal forms a cover which is freely placed over the front face of pedal plate 11. A frame or ring plate 13 is fixed on said plate 12 by means of screw bolts 43 and nuts 43a and comes into engagement with the rim portion of the rear face of said plate 11, under the action of pressure springs 15, the latter being lodged within housings 14 provided on said plate 11. The bolts 43 placed at the four corners of plate 12 extend through rollers 44. The pedal 11 which is cut away at the corners 11b bears against the latter when thrust laterally. The pressure springs 15 return the foot-plate into its initial position after displacement.

In operation the tension of all the springs 15 together is adjusted to be less than that of the return spring for the brake rod, and therefore the plate 12 is forced by pressure of the foot on to the plate 11. The spindle 10 at the same time also moves to the left and forces the valve disc to the left by means of the spring 18 and the set screw 19. Even if spindle 10 is only slightly displaced the valve plate 21 bears against the hollow screw 29 and cuts off connection with the atmosphere; consequently air is sucked out of the cylinder 1 through the pipe 31 owing to the vacuum obtaining in the suction pipe 27, 28. The piston 2 therefore moves to the left, the brake lever 4 is turned in the direction of the arrow, and the brake is applied through the rod 5.

If the foot does not follow the brake lever any further, then the action of the atmosphere on the valve plate 21 will cause the plate 12 to come to rest and with it the valve disc 17 and the spindle 10. This spindle is maintained in contact with the plate 12 just as long as the vacuum obtains in the pipe 27. The valve 21, 29 is again opened and atmospheric air enters the cylinder 1. The return spring can then again move the brake lever 4 into the initial position as the pressure balances on both sides of the piston 2. The valve housing also moves to the right, along with the brake lever. The result is that the atmospheric valve is again closed, a vacuum is again produced in the cylinder 1 which again produces the movement to the left and so on. As the stroke of the valve is small, a practically uniform brake power is obtained in this manner when the foot is at rest.

The action described above may be explained in greater detail as follows: If the foot of the operator, acting on the pedal 12 is stopped after having impressed a certain angular displacment on the lever 4 in the direction of the arrow, this lever thereafter experiences a slight supplementary displacement to the left under the action of the vacuum produced in the cylinder 1. This slight displacement moves the valve housing to the left and also moves the plate 11 away from the table or platform 12 which is being held stationary by the foot of the operator. The rod 10 tends to remain in contact with the table 12 under the action of spring 18 as well as under the action of atmospheric pressure acting on the face 21 on the valve 17. This atmospheric action lasts as long as the valve 22 is depressed, that is, as long as a depression controls the conduit 27.

If greater braking power is desired it is only necessary for the driver to continue to press with the foot on the plate 12 and accordingly also on the spindle 10 and the valve plate 21 to cut off atmospheric air on the forward movement of the brake rod and of the valve housing. The operation of braking is thus a very light one.

If the foot is removed from the pedal the plate 12 returns into its initial position and the pressure of the atmosphere closes the suction valve, atmospheric air enters the cylinder 1, and the brakes are released.

The sensitivity of the brake can be regulated by adjustment of the stroke of the valve disc 17 within the limits determined by the necessary cross section of the air passage. For this purpose the hollow sleeve 29 is screwed up to or away from the stationary valve seat 23. With a small stroke the oscillations of the system are smaller and more rapid on holding the foot at rest, and with a long stroke are longer and slower.

If for any reason the vacuum from the engine is cut off or if the servo brake is to be assisted by foot pressure then the driver must be able to brake by muscular power. For this purpose a spring 18 is inserted between the spindle 10 and the adjusting screw 19 and is of such strength that it is not compressed by the pressure difference between the atmosphere and the suction air and only gives when the valve 21 is forced on to its seating with a force greater than this pressure difference. This is the case when braking is effected directly with the foot, the driver pressing so strongly on the plate 12 that the spindle 10 moves so far to the left that the plate 12 bears against the pedal plate 11. The braking force exerted by the foot is then transmitted directly through the pedal plate 11 and the pipe 7 to the brake lever 5 and from the latter to the rod 5 as a pull.

Figure 3:
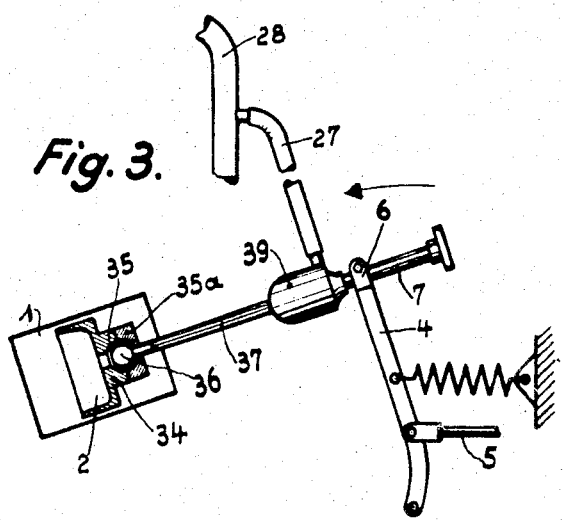
Figure 3 is a corresponding view of a modification.
Figure 4:
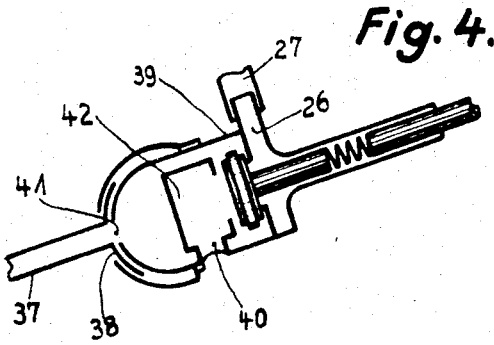
Figure 4 is a diagrammatic view of certain parts of Figure 3.

Figure 3 shows a construction in which instead of a flexible pipe a rigid pipe is inserted between the servo piston and the pressure regulating device.

Figure 2:
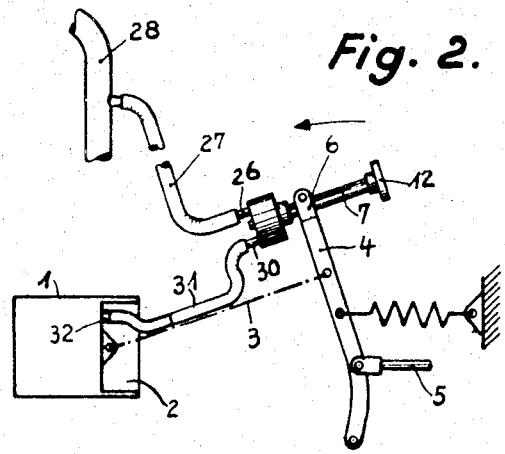
Figure 2 is an outside elevation of the parts.

The base of the piston 2 is bored centrally and is also provided in the centre with a boss 34 having a recess 35 in which the spherical head 36 of the connecting pipe 37 is mounted. The part 35a acts as a cover. The other end 38 of the pipe is also spherical and is secured against thrust and tension in the valve housing 39 of the pressure regulating device. The housing has three apertures namely an aperture 26 for the vacuum connection, an aperture 40 for atmospheric air and an aperture 41 for the connection with the servo cylinder. In order to transmit the force axially, the duct 41 is displaced along the axis of the pressure regulating device, and the atmospheric air therefor is led from the side through aperture 40 into a special internal valve chamber 42. The method of operation of this device is the same as that described for Figures 1 and 2. The sole difference is that the connecting pipe 37 also transmits the braking power from the piston to the brake lever.

Having fully described my invention, what I claim as new and desire to secure by Letters Patent is:

1. A brake control device comprising in combination a brake lever, a brake cylinder, a piston in said cylinder, a connection between said piston and said brake lever, a valve chamber communicating with said cylinder, a connection between said valve chamber and the atmosphere, a connection between said valve chamber and a source of pressure different from atmosphere, a valve controlling the openings of said connections, a spring loaded pedal plate, a base plate for supporting and guiding said pedal plate, a spring loaded spindle between said valve and said pedal plate, the spindle operating the valve according to the movement of the pedal plate, means to rigidly connect the valve chamber and the base plate to the top of the brake lever, and means to adjust the distance of the valve openings connecting the valve chamber to the atmosphere and to the source of pressure different from atmosphere.

2. A brake control device comprising in combination a brake lever, a brake cylinder, a piston in said cylinder, a connection between said piston and a brake lever, a valve chamber communicating with said cylinder, a connection between said valve chamber and the atmosphere, a connection between said valve chamber and a source of pressure different from atmosphere, a valve controlling the openings of said connections, a spring loaded pedal plate, a base plate for supporting and guiding said pedal plate, a spring loaded spindle between said valve and said pedal plate, the spindle operating the valve according to the movement of the pedal plate, means to connect the valve chamber with the base plate to form a unitary structure, means for rigidly securing said unitary structure to the top of the brake lever, said securing means allowing said chamber and said base plate to be adjusted in the direction of the lift of said lever.

3. A brake control device comprising in combination a brake lever, a brake cylinder, a piston in said cylinder, a connection between said piston and a brake lever, a valve chamber communicating with said cylinder, a connection between said valve chamber and the atmosphere, a connection between said valve chamber and a source of pressure different from atmosphere, a valve controlling the openings of said connections, a spring loaded pedal plate, a base plate for supporting and guiding said pedal plate, means to operate the valve according to the movement of the pedal plate, means to connect the valve chamber and the base plate to the top of the brake lever, and a ring plate fixed to the pedal plate for holding said pedal plate against the influence of biasing springs between the base plate and the pedal plate.

4. A brake control device comprising in combination a brake lever, a brake cylinder, a piston in said cylinder, a connection between said piston and a brake lever, a valve chamber communicating with said cylinder, a connection between said valve chamber and the atmosphere, a connection between said valve chamber and a source of pressure different from atmosphere, a valve controlling the openings of said connections, a spring loaded pedal plate, a base plate for supporting and guiding said pedal plate, means to operate the valve according to the movement of the pedal plate, means to connect the valve chamber and the base plate to the top of the brake lever, a ring plate fixed to the pedal plate for holding said plate against the influence of biasing springs between the base plate and the pedal plate, abutments on the pedal plate and recesses in the base plate for guiding said abutments with a small clearance.

In testimony whereof I have hereunto affixed my signature.

FRANZ KRATZ.